US012671659B2

(12) United States Patent
Taft et al.

(10) Patent No.: US 12,671,659 B2
(45) Date of Patent: Jun. 30, 2026

(54) METHOD AND SYSTEM FOR MULTI-DOMAIN-BASED LOW LATENCY, LOW LOSS, AND SCALABLE THROUGHPUT CONGESTION CONTROL

(71) Applicant: Verizon Patent and Licensing Inc., Basking Ridge, NJ (US)

(72) Inventors: David Taft, Keller, TX (US); Mark T. Watts, Newport, RI (US); Nicklous D. Morris, Trophy Club, TX (US); Ravi Potluri, Coppell, TX (US); Luay Jalil, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 176 days.

(21) Appl. No.: 18/419,842

(22) Filed: Jan. 23, 2024

(65) Prior Publication Data

US 2025/0240250 A1     Jul. 24, 2025

(51) Int. Cl.
*H04L 47/263* (2022.01)
*H04L 47/2466* (2022.01)
*H04W 28/02* (2009.01)

(52) U.S. Cl.
CPC ........ *H04L 47/263* (2013.01); *H04L 47/2466* (2013.01); *H04W 28/0236* (2013.01)

(58) Field of Classification Search
CPC ... H04L 47/263; H04L 47/2466; H04L 47/10; H04L 47/11; H04L 47/12; H04W 28/0236; H04W 28/02; H04W 28/0284; H04W 28/0289
See application file for complete search history.

(56) References Cited

U.S. PATENT DOCUMENTS

| | | | | |
|---|---|---|---|---|
| 6,542,466 B1 * | 4/2003 | Pashtan | ................. | H04L 43/00 |
| | | | | 370/235 |
| 7,058,015 B1 * | 6/2006 | Wetherall | .............. | H04L 43/062 |
| | | | | 709/224 |
| 2005/0018608 A1 * | 1/2005 | Wetherall | ............ | H04L 47/2433 |
| | | | | 370/235 |
| 2020/0267596 A1 * | 8/2020 | Sudarsan | .............. | H04W 36/22 |
| 2024/0381171 A1 * | 11/2024 | Vaidya | .............. | H04W 28/0268 |
| 2025/0126064 A1 * | 4/2025 | Ke | .......................... | H04L 47/31 |

* cited by examiner

*Primary Examiner* — Johnny B Aguiar

(57) ABSTRACT

A method, a network device, and a non-transitory computer-readable storage medium are described in relation to a coordinated domain-based low latency, low loss, and scalable throughput (L4S) service. The service may enable end-to-end congestion control based on a predetermined order of domains, which are associated with L4S devices that support a packet flow, for which congestion control responses are to be provided. The service may provide independent feedback loops of state information from each domain and associated L4S device. The feedback loops may operate on different timescales. The service may coordinate congestion control among domains of an end-to-end path that support the packet flow and prevent fragmented or contentious congestion control responses between the domains.

20 Claims, 4 Drawing Sheets

100

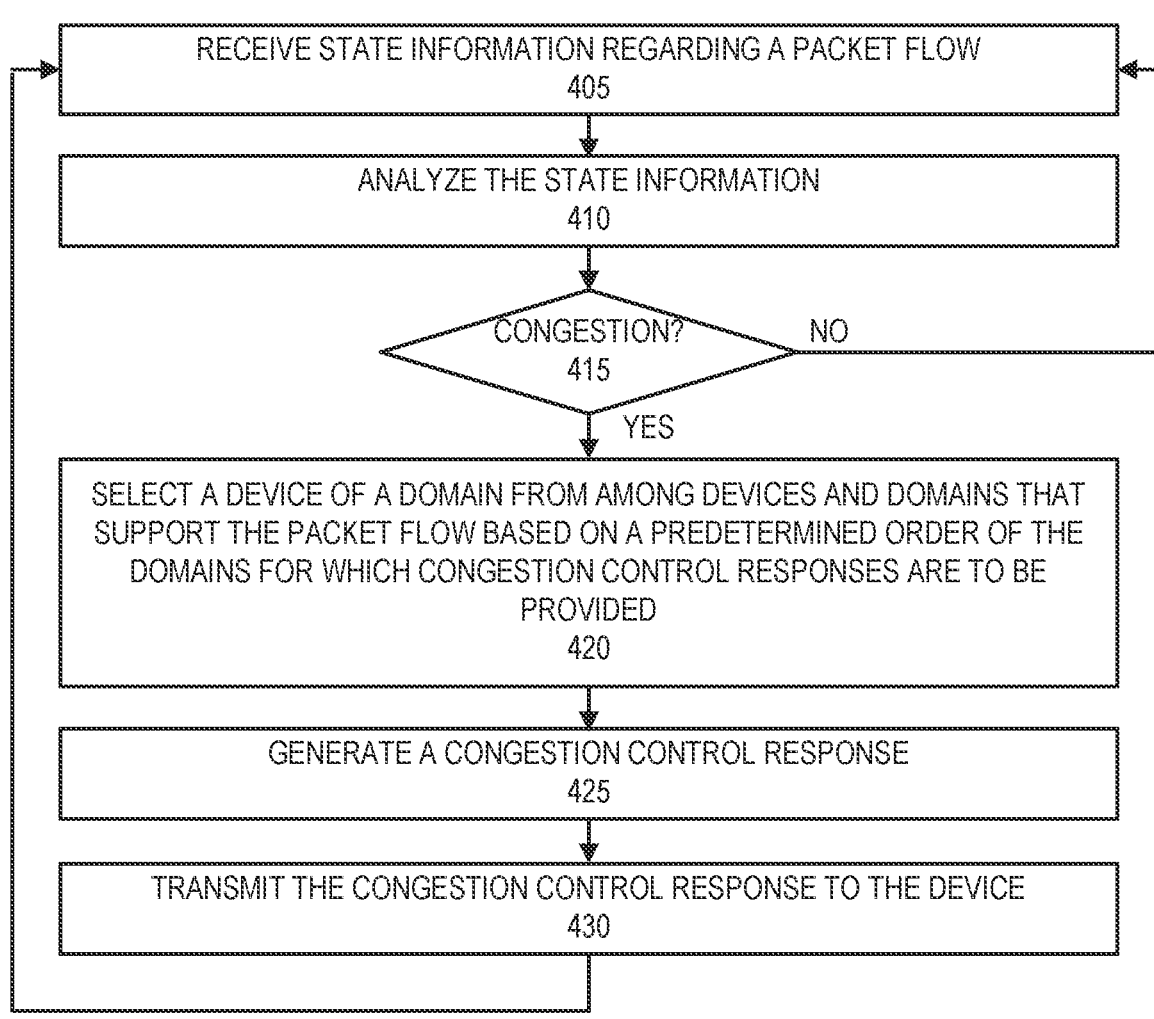

400

RECEIVE STATE INFORMATION REGARDING A PACKET FLOW
405

ANALYZE THE STATE INFORMATION
410

CONGESTION?
415

NO

YES

SELECT A DEVICE OF A DOMAIN FROM AMONG DEVICES AND DOMAINS THAT SUPPORT THE PACKET FLOW BASED ON A PREDETERMINED ORDER OF THE DOMAINS FOR WHICH CONGESTION CONTROL RESPONSES ARE TO BE PROVIDED
420

GENERATE A CONGESTION CONTROL RESPONSE
425

TRANSMIT THE CONGESTION CONTROL RESPONSE TO THE DEVICE
430

Fig. 4

METHOD AND SYSTEM FOR MULTI-DOMAIN-BASED LOW LATENCY, LOW LOSS, AND SCALABLE THROUGHPUT CONGESTION CONTROL

BACKGROUND

End devices may connect to a radio access network (RAN) according to several types of configurations and may be afforded different quality of service (QoS) levels. Various mechanisms and technologies may be used to ensure the delivery of certain performance metrics, such as minimal latency and packet loss, as well as high throughput and other types of network performance criteria. Low latency, low loss, and scalable throughput (L4S) is a technology whose aim is to drastically reduce latency experienced by packets traveling across the Internet and support high throughput.

BRIEF DESCRIPTION OF THE DRAWINGS

FIG. 4 is a flow diagram illustrating another exemplary process of an exemplary embodiment of the coordinated domain-based L4S service.

DETAILED DESCRIPTION

Figure 1:
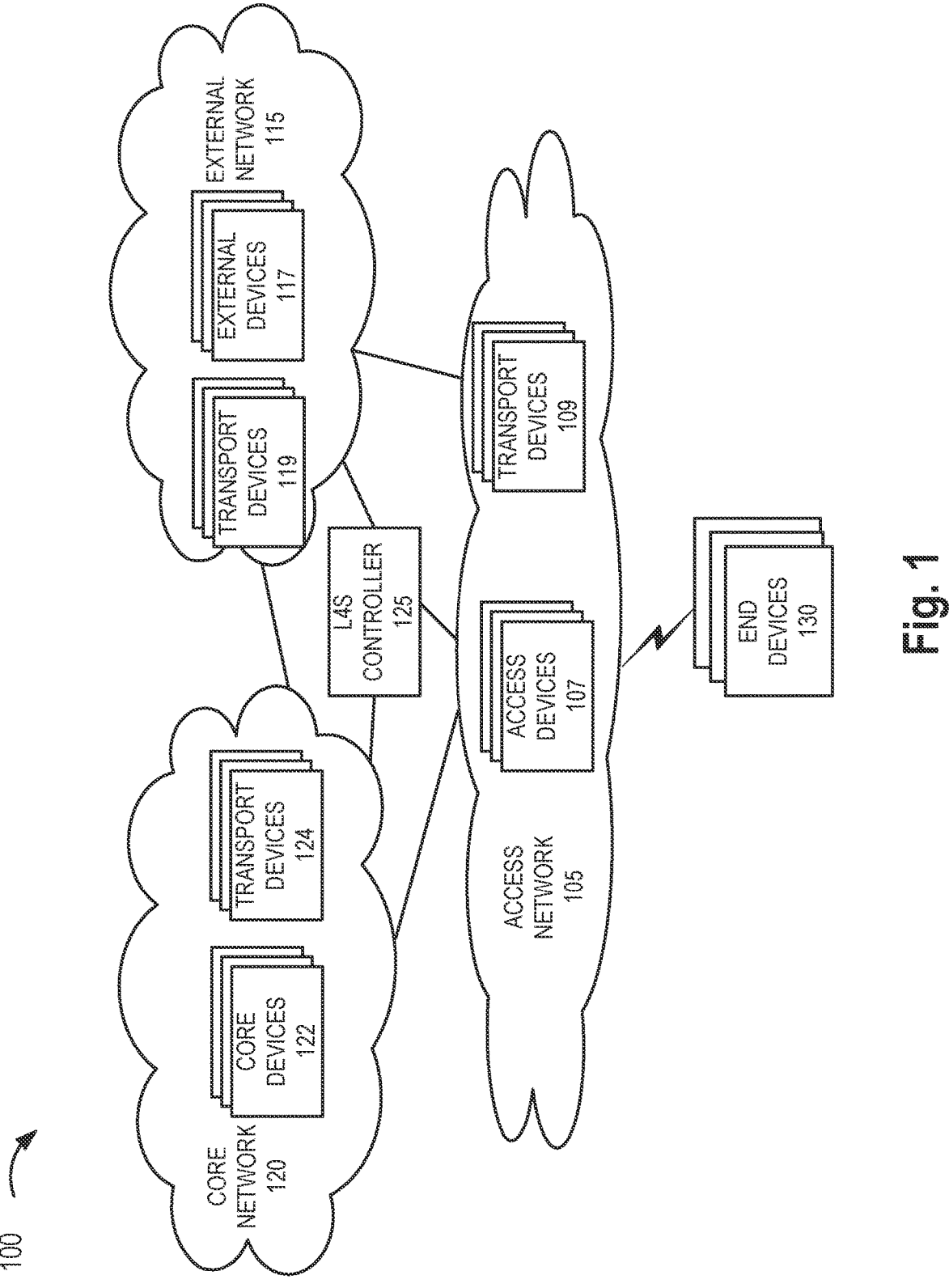
FIG. 1 is a diagram illustrating an exemplary environment in which an exemplary embodiment of a coordinated domain-based L4S service may be implemented.

The following detailed description refers to the accompanying drawings. The same reference numbers in different drawings may identify the same or similar elements. Also, the following detailed description does not limit the invention.

L4S mechanisms may drastically reduce latency experienced by packets traveling across the Internet and may support high throughput. L4S may provide fast rate adaptation management and may reduce network congestion, queuing, and packet loss. An Explicit Congestion Notification (ECN) scheme at the Internet Protocol (IP) layer may be used to support L4S.

Typically, L4S mechanisms may be applied independently to different cross-sections of the network, such as a RAN, a core network, a transport network, and a user IP layer, primarily due to different protocols used like tunneling, headers, and other factors. However, this approach may yield sub-optimal results for an end-to-end packet flow. For example, traffic from a cell site may not always select an optimal route from a latency and/or utilization perspective due to static allocations. Also, with network slicing, the diversity of traffic and services offered via the cell site is evolving and routing policies may not be optimized to accommodate the distinctive QoS levels.

Independent treatment of L4S to different cross-sections of the network may lead to fragmented and contentious results. For example, if L4S mechanisms operate in the transport network, such action may negatively impact the RAN in which circuit instability (also known as "flapping") may occur. Thus, it may be desirable to limit contention between domains or cross-sections of the network and provide feedback loops that offer a near real-time control of L4S mechanisms in a coordinated manner.

According to exemplary embodiments, a coordinated domain-based L4S service is described herein. According to an exemplary embodiment, the coordinated domain-based L4S service may be implemented by a network device. For example, the network device may be implemented as an L4S controller device or platform. The network device may include artificial intelligence and/or machine learning (AI/ML) logic directed to analytics that support the coordinated domain-based L4S service, as described herein.

According to an exemplary embodiment, the coordinated domain-based L4S service may include a coordination between L4S management across different domains or segments of a path or route of a network associated with a flow of packets, as described herein. For example, the domains may include a user IP layer, a RAN layer, a transport network layer, and a core network layer. According to an exemplary embodiment, each domain may include a unique L4S approach for management L4S services. For example, for the user IP layer, the L4S approach may include a dual-queue (DualQ) coupled active queue management (AQM) framework, Transmission Control Protocol (TCP) Prague (e.g., Prague L4S requirements), and ECN Congestion marking. For the RAN layer, the L4S approach may include uplink counters and user plane function (UPF) markings, for example. For the transport layer, the L4S approach may include outer IP layer mechanisms based on Differentiated Services Code Point (DSCP) or another field, for example. For the core network layer, the L4S approach may include DualQ and counters, for example.

According to an exemplary embodiment, the coordinated domain-based L4S service may provide domain-based feedback loops that are independent of each. The domain-based feedback loop may include performance measurement or state information, as described herein. According to an exemplary embodiment, the domain-based feedback loops may be bi-directional in nature between the network device and a device of a particular domain, as described herein.

According to an exemplary embodiment, the coordinated domain-based L4S service may include domain-based feedback loops that operate according to different time scales or time granularities. For example, the user IP layer may operate at the finest time granularity among the other domains while the transport layer may operate at the coarsest time granularity among the other domains. The RAN layer may operate at a finer time granularity than the core network layer.

According to an exemplary embodiment, the coordinated domain-based L4S service may include a domain-based ordering of L4S reactive mechanisms. For example, the coordinated domain-based L4S service may initially begin with the user IP layer, which may operate at the finest time granularity and provided through polling or subscription, and methodically cycle through the remaining domains in which each domain may apply different reactionary L4S mechanisms based on AI/ML. For example, a user IP layer L4S change may be sustained while other L4S changes may be invoked in other domains before proceeding with additional user IP layer L4S changes.

According to an exemplary embodiment, the coordinated domain-based L4S service may analyze the state information provided via some or all of the domain-based feedback loops and calculate an optimal L4S response. For example, the AI/ML logic of the coordinated domain-based L4S service may consider a current and/or a prospective congestive state of the flow of packets, historical L4S reactionary measures taken and outcomes associated with the same route and/or similar route, the type or category of an application associated with the flow of packets, the device (e.g., RAN device, core device, end device, transport network device, etc.) associated with the route and/or segment of the network, the L4S reactionary mechanism available with each device of a domain, context information (e.g., location, time (e.g., day, time of day, etc.)), and/or other factors, as described herein.

According to an exemplary embodiment, the coordinated domain-based L4S service may determine an appropriate congestion control response based on the analysis of the state information. For example, when there is congestion, the AI/ML may include logic that optimally reduces the congestion towards no congestion based on the L4S mechanisms, the device, and the domain of relevance. The AI/ML may include logic that optimally maintains a no congestion state and minimize and/or prevent congestion to occur.

In view of the foregoing, the coordinated domain-based L4S service may limit re-routing of traffic and services at the lower layers (e.g., link layer, medium access control (MAC) layer, etc.) based on holistic network approach of L4S mechanisms that may limit contention between domains of the network associated with an end-to-end packet flow. Additionally, the coordinated domain-based L4S service may enhance access and use of application services that support L4S or another QoS, and ECN.

FIG. 1 is a diagram illustrating an exemplary environment 100 in which an exemplary embodiment of a coordinated domain-based L4S service may be implemented. As illustrated, environment 100 includes an access network 105, an external network 115, and a core network 120. Access network 105 includes access devices 107 (also referred to individually or generally as access device 107) and transport devices 109 (also referred to individually or generally as transport device 109). External network 115 includes external devices 117 (also referred to individually or generally as external device 117) and transport devices 119 (also referred to individually or generally as transport device 119). Core network 120 includes core devices 122 (also referred to individually or generally as core device 122) and transport devices 124 (also referred to individually or generally as transport device 124). Environment 100 further includes an L4S controller 125 and end devices 130 (also referred to individually or generally as end device 130).

Although L4S controller 125 is depicted outside of access network 105, external network 115, and core network 120, such depiction is merely exemplary. L4S controller 125 may be deployed, in whole or in part, in any of these networks. Transport devices, such as transport devices 109, 119, and/or 124 may be included in fewer networks than those depicted (e.g., transport devices 119 may be omitted, etc.) or may be included in other networks (e.g., an X-haul network, a transport network, etc.) not specifically illustrated but described herein.

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included that may support a wireless service and/or an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), client/server, peer-to-peer, etc.) and/or implemented with various networking approaches (e.g., logical, virtualization, network slicing, etc.). The number, the type, and the arrangement of network devices are exemplary.

Environment 100 includes communication links between the networks and between the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane (CP), a user plane (UP), and a network management plane. Environment 100 may include other types of planes of communication. A message communicated in support of the coordinated domain-based L4S service may use at least one of these planes of communication. According to various exemplary implementations, the interface of the network device may be a service-based interface, a reference point-based interface, an Open Radio Access Network (O-RAN) interface, a 5G interface, another generation of interface (e.g., 5.5G, Sixth Generation (6G), Seventh Generation (7G), etc.), or some other type of network interface (e.g., proprietary, etc.).

Access network 105 may include one or multiple networks of one or multiple types and technologies. For example, access network 105 may be implemented to include a Fifth Generation (5G) RAN, a future generation RAN (e.g., a Sixth Generation (6G) RAN, a Seventh Generation (7G) RAN, etc.), a centralized-RAN (C-RAN), an Open-RAN (O-RAN), and/or another type of access network. Access network 105 may include a legacy RAN (e.g., a Third Generation (3G) RAN, a Fourth Generation (4G) RAN, etc.). Access network 105 may communicate with and/or include other types of access networks, such as, for example, a Wi-Fi network, a local area network (LAN), a Citizens Broadband Radio System (CBRS) network, a cloud RAN, a virtualized RAN (vRAN), a self-organizing network (SON), a wired network (e.g., optical, cable, etc.), or another type of network that provides access to or can be used as an on-ramp to access network 105 and/or core network 120.

Access network 105 may include different and multiple functional splitting, such as options 1, 2, 3, 4, 5, 6, 7, or 8 that relate to combinations of access network 105 and core network 120 including an Evolved Packet Core (EPC) network and/or a Next Generation Core (NGC)/5G core network, or the splitting of the various layers (e.g., physical layer, media access control (MAC) layer, radio link control (RLC) layer, and packet data convergence protocol (PDCP) layer, etc.), plane splitting (e.g., user plane, control plane, etc.), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), carrier aggregation (CA) (e.g., intra-band, inter-band, contiguous, non-contiguous, etc.), edge and core network slicing, coordinated multipoint (COMP), various duplex schemes (e.g., frequency division duplex (FDD), time division duplex (TDD), half-duplex FDD (H-FDD), etc.), and/or another type of connectivity service (e.g., NSA new radio (NR), SA NR, etc.).

According to some exemplary embodiments, access network 105 may be implemented to include various architectures of wireless service, such as, for example, macrocell, microcell, femtocell, picocell, metrocell, NR cell, Long Term Evolution (LTE) cell, non-cell, or another type of wireless architecture. Additionally, according to various exemplary embodiments, access network 105 may be implemented according to various wireless technologies (e.g., RATs, etc.), and various wireless standards, frequencies, bands, and segments of radio spectrum (e.g., centimeter (cm) wave, millimeter (mm) wave, below 6 gigahertz (GHz), above 6 GHz, higher than mm wave, C-band, licensed radio spectrum, unlicensed radio spectrum, above mm wave), and/or other attributes or technologies used for radio communication. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a next generation Node B (gNB), an enhanced LTE (eLTE) evolved Node B (eNB), an eNB, a radio network controller (RNC), a radio intelligent controller (RIC), a base station controller (BSC), a remote radio head (RRH), a baseband unit (BBU), a radio unit (RU), a remote radio unit (RRU), a centralized unit (CU), a CU-control plane (CP), a CU-user plane (UP), a distributed unit (DU), a small cell node (e.g., a picocell device, a femtocell device, a microcell device, a home eNB, a home gNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station).

Access device 107 may include other types of wireless access devices, such as a WiFi device, a hotspot device, and/or a fixed wireless access customer premise equipment (FWA CPE), etc.) that provides a wireless access service. Additionally, access devices 107 may include a wired and/or an optical device (e.g., modem, wired access point, optical access point, Ethernet device, multiplexer, etc.) that provides network access and/or transport service.

According to some exemplary implementations, access device 107 may include a combined functionality of multiple radio access technologies (RATs) (e.g., 4G and 5G functionality, 5G and 5.5G functionality, 5G and 6G), etc.) via soft and hard bonding based on demands and needs. According to some exemplary implementations, access device 107 may include a split access device (e.g., a CU-control plane (CP), a CU-user plane (UP), etc.) or an integrated functionality, such as a CU-CP and a CU-UP, or other integrations of split RAN nodes. Access device 107 may be an indoor device or an outdoor device.

Transport device 109 may be implemented as a router or similar network device that may support a transport layer protocol (e.g., user datagram protocol (UDP), transmission control protocol (TCP), QUIC, Real-time Transport Protocol (RTP), etc.).

External network 115 may include one or multiple networks of one or multiple types and technologies that provide an application service. For example, external network 115 may be implemented using one or multiple technologies including, for example, network function virtualization (NFV), SDN, cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a multi-access edge computing (MEC) network, a fog network, the Internet, a packet data network (PDN), a service provider network, the World Wide Web (WWW), an Internet Protocol Multimedia Subsystem (IMS) network, a Rich Communication Service (RCS) network, a software-defined (SD) network, a virtual network, a packet-switched network, a data center, a data network, or other type of application service layer network that may provide access to and may host an end device application service.

Depending on the implementation, external network 115 may include various network devices such as external devices 117. For example, external devices 117 may include virtual network devices (e.g., virtualized network functions (VNFs), servers, host devices, application functions (AFs), application servers (ASs), server capability servers (SCSs), containers, hypervisors, virtual machines (VMs), pods, network function virtualization infrastructure (NFVI), and/or other types of virtualization elements, layers, hardware resources, operating systems, engines, etc.) that may be associated with application services for use by end devices 130. By way of further example, external devices 117 may include mass storage devices, data center devices, NFV devices, SDN devices, cloud computing devices, platforms, and other types of network devices pertaining to various network-related functions (e.g., security, management, charging, billing, authentication, authorization, policy enforcement, development, etc.). Although not illustrated, external network 115 may include one or multiple types of core devices 122, as described herein.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Megabits per second (Mbps), ultra-low-cost network, etc.), enhanced mobile broadband (eMBB), higher user mobility (e.g., high speed train, remote computing, moving hot spots, etc.), Internet of Things (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), massive machine-type communications (mMTC), voice, video calling, video conferencing, instant messaging), video streaming, fitness services, navigation services, online gaming, web services, and/or other types of wireless and/or wired application services. External devices 117 may also include other types of network devices that support the operation of external network 115 and the provisioning of application services, such as an orchestrator, an edge manager, an operations support system (OSS), a local domain name system (DNS), registries, and the like. External devices 117 may include non-virtual, logical, and/or physical network devices.

Transport device 119 may be implemented as a router or similar network device that may support a transport layer protocol (e.g., User Datagram Protocol (UDP), Transmission Control Protocol (TCP), Quick UDP Internet Connection (QUIC), Real-time Transport Protocol (RTP), etc.). According to other exemplary implementations, transport device 119 may be implemented as a network layer (e.g., an IP or Layer 3) switch.

Core network 120 may include one or multiple networks of one or multiple network types and technologies. Core network 120 may include a complementary network of access network 105. For example, core network 120 may be implemented to include a 5G core network, an EPC of an LTE network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include diverse types of network devices that are illustrated in FIG. 1 as core devices 122. For example, core devices 122 may include a user plane function (UPF), a Non-3GPP Interworking Function (N3IWF), an access and mobility management function (AMF), a session management function (SMF), a unified data management (UDM) device, a unified data repository (UDR), an authentication server function (AUSF), a security anchor function (SEAF), a network slice selection function (NSSF), a network repository function (NRF), a policy control function (PCF), a network data analytics function (NWDAF), a network exposure function (NEF), a service capability exposure function (SCEF), a lifecycle management (LCM) device, a mobility management entity (MME), a packet data network gateway (PGW), an enhanced packet data gateway (ePDG), a wireless access gateway (WAG), a tunnel termination gateway (TTG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS).

According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), and/or other combined nodes (e.g., an HSS with a UDM/UDR, an MME with an AMF, etc.). Also, core devices 122 may include a split core device 122. For example, core devices 122 may include a session management (SM) PCF, an access management (AM) PCF, a user equipment (UE) PCF, and/or another type of split architecture associated with another core device 122, as described herein.

Transport device 124 may be implemented as a router or similar network device that may support a transport layer protocol (e.g., UDP, TCP, QUIC, RTP, etc.). According to other exemplary implementations, transport device 124 may be implemented as a network layer (e.g., an IP or Layer 3) switch.

L4S controller 125 may include a network device that provides an exemplary embodiment of the coordinated domain-based L4S service, as described herein. For example, L4S controller 125 may manage L4S mechanisms relating to packet flows traversing domains or segments of networks, as described herein. According to an exemplary embodiment, L4S controller 125 may include AI/ML logic that may analyze state information communicated by devices of a domain via domain-based feedback loops. For example, L4S controller 125 may obtain state information from one or multiple sources, such end device 130, access device 107, external device 117, core device 122, transport device 109, transport device 119, transport device 124, and/or a network performance management system (not illustrated).

According to various exemplary embodiments, the state information may include congestion values that pertain to a network device, end device 130, a communication link between devices of a domain (e.g., between transport devices 109 of the transport layer, etc.), devices between domains (e.g., between core device 122 of the core network layer and transport device 124 of the transport layer, etc.), a segment of a network route, a subnetwork slice (e.g., a RAN slice, a core slice, etc.), a tunnel, a bearer, and a flow of packets (e.g., a quality of service (QoS) flow, an application service session traffic flow, a packet data unit (PDU) session traffic flow, etc.) relative to a period of time. According to some exemplary embodiments, the state information may include globally unique identifiers of devices, network slice identifiers of relevance that relate to the flow of packets and associated devices of the network path, layer 4 information (e.g., TCP/UDP), and/or other types of performance metric data (e.g., round-trip-time (RRT), retransmission delay, etc.).

Depending on the device of the domain, the type and/or form of the congestion values may differ. For example, the congestion values may relate to or indicate queue levels, queuing delay values, throughput values, counter values, packet drop rates, percentage of packets that a UPF (or other user plane gateway, such as a PGW or the like) uses for ECN marking for L4S of the packet flow, and so forth. The state information may pertain to packet flows in the uplink (UL) and the downlink (DL). The state information may include context information pertaining to the flow of packets, such as a flow identifier, a QoS Flow identifier (QFI), source and destination IP addresses, source and destination ports, and/or other types of information (e.g., MAC addresses, traffic interfaces, IP type of service, a QoS value (e.g., a Differentiated Services Code Point (DSCP) value, a Layer 3 type QoS marking, etc.), a 5G QoS Identifier (5QI), a QoS Class identifier (QCI) value, etc.) that may be used to uniquely identify a packet flow and/or relates to the packet flow.

For purposes of description, the term "packet" is intended to be broadly interpreted to include a data transmission or communication, the packaging of which may correspond to, for example, a packet, a cell, a frame, a datagram, some other type of container or unit of data, or a fragment thereof. A "packet flow" or "flow of packets" may be interpreted as a sequence or series of packets that share certain attributes, such as the same source and destination IP addresses, the same source and destination ports, and so forth, as understood in the art. According to various exemplary embodiments, the coordinated domain-based L4S service may pertain to an IP version 4 (IPv4) packet flow, an IP version 6 (IPv6) packet flow, a guaranteed bit rate (GBR) QoS flow, a non-GBR QoS flow, a PDU session flow, an L4S packet flow, or the like.

According to various exemplary embodiments, L4S controller 125 may obtain network topology information from a network management system, an orchestrator that may manage and provision virtual devices (e.g., access device 107, transport device 109, etc.), and/or a network performance system. The network topology information may indicate the type, number, and placement of access devices 107, external devices 117, core devices 122, and the transport devices (e.g., transport devices 109, 119, and 124). The network topology information may include network device identifiers, network slice identifiers, and/or other types of unique identifiers. The network topology information may indicate connectivity information pertaining to network devices and other types of network elements (e.g., logical, virtual, network slices, links, etc.) of a network, such as access network 105, external network 115, and core network 120. The network topology information may indicate placement of a network device according to geographic coordinates (e.g., latitude/longitude values, azimuth values) of a geographic coordinate system (GCS), or coordinate values associated with another type of coordinate system (e.g., a projected coordinate system (PCS), etc.). The network topology information may include map information. For example, the map information may indicate a geographic area (e.g., country, state, county, city, town, province, etc. The network topology information may include Voronoi-based area (e.g., a cell, a sector, a zone/sub-sector, etc.), geo-bin area, and/or another division of a geographic area representative of radio coverage, network service coverage, service area of core device 122, and so forth.

L4S controller 125 may obtain device profile information pertaining to the device of a domain, as described herein. For example, the device profile information may include specification, characteristics, configuration, and/or the like regarding memory, storage, processor, ports, communication interfaces, protocol stack, queues (e.g., number, type (e.g., L4S queue, Classic or non-L4S queue, size, etc.), type of device (e.g., CU versus DU, UPF versus PGW, etc.), generation of device (e.g., 5G, 6G, 4G, etc.), and L4S service mechanisms (e.g., ECN marking and unmarking, rate adaptation and scheduling, and the like).

L4S controller 125 may analyze the state information, the network topology information, device profile information, historical state information, historical L4S congestion control decisions and outcomes across one or multiple domains, as described. L4S controller 125 may determine a response based on the analysis. For example, L4S controller 125 may determine an optimal response that addresses a current and/or prospective congestion, as described herein.

According to an exemplary embodiment, the response may include L4S controller 125 providing L4S congestion control across the domains in a predetermined order, as described herein. For example, L4S controller 125 may initially address congestion in the user IP layer domain. If unsuccessful, L4S controller 125 may perform further analysis and invoke L4S measures in the RAN layer domain. If unsuccessful, this process may continue in which L4S controller 125 may perform additional analysis and invoke L4S measures in the core network layer domain, and if unsuccessful, perform additional analysis and invoke L4S measures in the transport layer domain, as described herein.

If still unsuccessful in reducing the congestion, L4S controller 125 may return to the user IP layer domain and repeat the process.

According to other exemplary embodiments, L4S controller 125 may address congestion in a different manner. For example, L4S controller 125 may not invoke L4S measures across the domains in a predetermined order (e.g., IP layer domain to RAN layer domain to core network layer domain to transport layer domain), but in a non-predetermined order, which may or may not include the invocation of L4S measures in multiple domains simultaneously.

End device 130 may include a device that may have communication capabilities (e.g., wireless, wired, optical, etc.). End device 130 may or may not have computational capabilities. End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a wearable device (e.g., a watch, glasses, headgear, a band, etc.), a computer, a gaming device, a television, a set top box, a music device, an Internet of Things (IoT) device, a drone, a smart device, an autonomous vehicle, or other type of wireless device (e.g., other type of user equipment (UE)). End device 130 may be configured to execute various types of software (e.g., applications, programs, etc.). The number and the types of software may vary among end devices 130. End device 130 may include "edge-aware" and/or "edge-unaware" application service clients. For purposes of description, end device 130 is not considered a network device. End device 130 may be implemented as a virtualized device in whole or in part.

According to an exemplary embodiment, end device 130, access device 107, transport device 109, external device 117, transport device 120, core device 122, and transport device 124 may each include logic of an exemplary embodiment of the coordinated domain-based L4S service, as described herein. According to an exemplary embodiment, the logic of the coordinated domain-based L4S service provided by end device 130, access device 107, transport device 109, external device 117, transport device 120, core device 122, and transport device 125 may include L4S feedback services with L4S controller 125 and various L4S mechanisms (e.g., DualQ, counters, ECN congestion marking, etc.) depending on the device (e.g., end device 130, access device 107, etc.) and/or the domain of the device (e.g., user IP layer, RAN layer, core network layer, etc.), as described herein.

Figure 2:
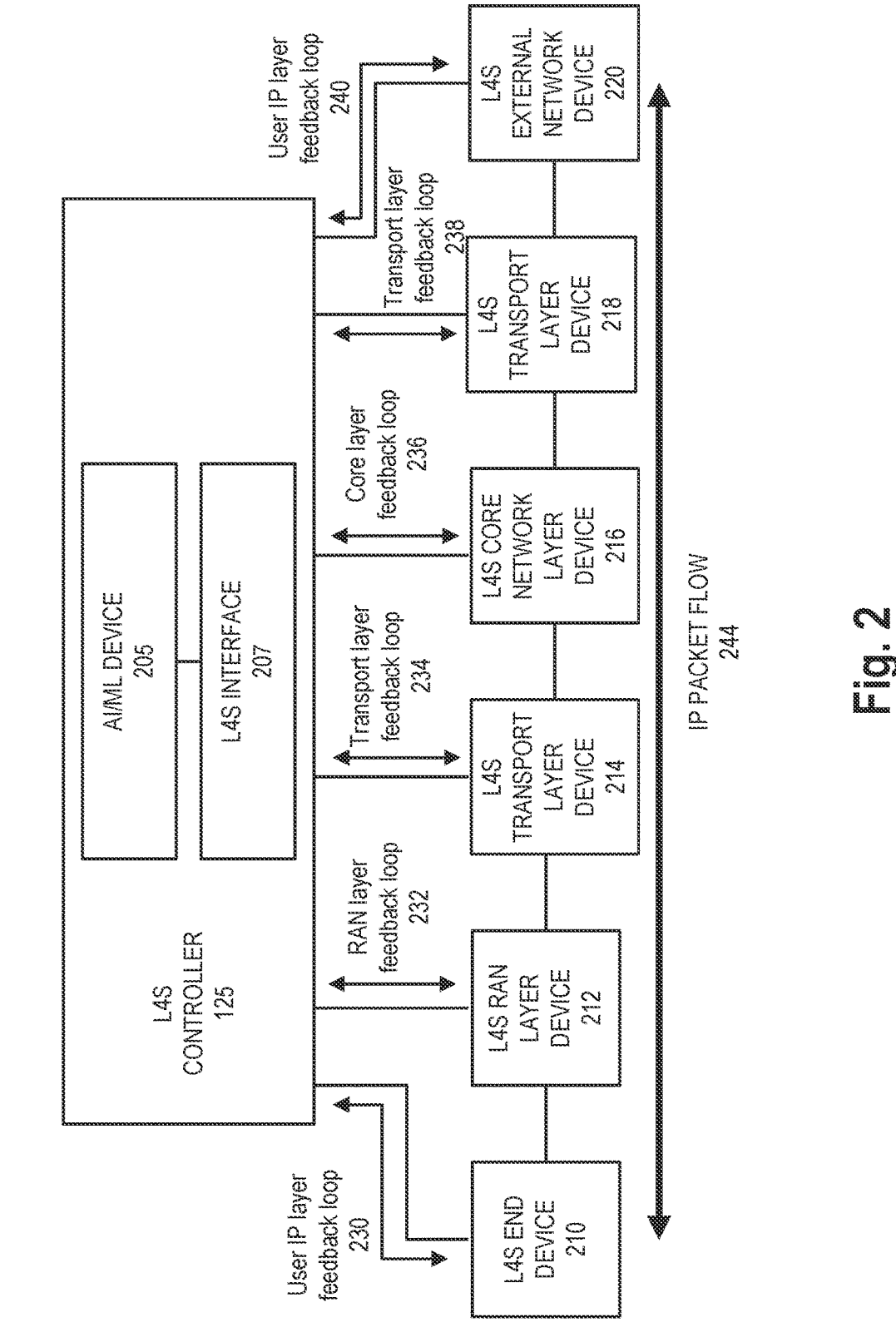
FIG. 2 is a diagram illustrating another exemplary environment in which an exemplary embodiment of the coordinated domain-based L4S service may be implemented.

FIG. 2 is a diagram illustrating another exemplary environment in which an exemplary embodiment of the coordinated domain-based L4S service may be implemented. As illustrated, exemplary environment 200 may include L4S controller 125, an L4S end device 210, an L4S RAN layer device 212, an L4S transport layer device 214, an L4S core network layer device 216, an L4S transport layer device 218, and an L4S external network device 220.

As illustrated, an exemplary embodiment of L4S controller 125 may include an AI/ML device 205 and an L4S interface 207. According to other exemplary embodiments, L4S controller 125 may be implemented with additional, fewer, and/or different components and/or devices. For example, one or multiple functions, steps, processes, services, and/or the like of the coordinated domain-based L4S service may be implemented by one or multiple components or devices.

AI/ML device 205 may include a network device or component that analyzes congestion associated with a flow of packets based on state information, device profile information, and other types of information, as described herein. According to various exemplary embodiments, the analysis of congestion may include current, predictive, and/or historical congestion.

AI/ML device 205 may include one or multiple types of models. For example, the models may include a time series model, a forecast model, a clustering model, and/or a classification model. The models may include a tree-based algorithm, a regressive algorithm, and/or another type of AI/ML algorithm or logic, such as Naïve Bayes, K-Nearest Neighbors, decision tree, Random Forest, gradient boosting, support vector machine, clustering via embedding, a dense neural network, a convolutional neural network, a recurrent neural network, and/or the like.

AI/ML device 205 may store policies, rules, and/or similar configurations that include threshold values relating to congestion control that enable AI/ML device 205 to determine a response based on the analysis. Generally, the response may invoke or start an L4S mechanism, cease or stop an L4S mechanism, increase the effort of congestion control, or decrease the effort of congestion control. For example, the response may include to begin L4S marking, stop L4S marking, perform rate adaptation, perform priority scheduling, perform packet dropping, perform another known form of L4S congestion control, or other forms of congestion control. According to some exemplary embodiments, the response may include a schedule for providing congestion control. For example, the schedule information may include start and stop time information. The start and stop time information may include date information, hour, minute, second, and/or sub-second information.

AI/ML device 205 may include one or multiple congestion control algorithms that may be directed to one or multiple aspects of congestion, such as queuing delay, interface delay, and propagation delay, and the consequences of congestion, such as end-to-end latency, jitter, packet loss, and bottleneck links, for example. According to some exemplary embodiment, AI/ML device 205 may include logic that provides congestion control on a domain basis governed by a predetermined order, as described herein. The congestion control algorithm(s) may further be configured to address inter-domain-based congestive relationships that optimally minimize destructive outcomes of L4S remedial measures.

L4S interface 207 may include a network device or a component that communicates with L4S end device 210, L4S RAN layer device 212, L4S transport layer device 214, L4S core network layer device 216, L4S transport layer device 218, and L4S external network device 220. The connections between L4S interface 207 (and more generally L4S controller 125) and the exemplary domain devices (e.g., L4S end device 210, L4S RAN layer device 212, etc.) are exemplary. Additionally, although depicted as a direct connection, the connection may be indirect and involve an intermediary device (not illustrated). Nevertheless, as illustrated, the communication between L4S interface 207 and the domain devices may include domain-based feedback loops, such as a user IP layer feedback loop 230, a RAN layer feedback loop 232, a transport layer feedback loop 234, a core layer feedback loop 236, a transport layer feedback loop 238, and a user IP layer feedback loop 240.

As previously described, according to an exemplary embodiment, each of the feedback loops may be independent from each other. According to an exemplary embodiment, each feedback loop of a dissimilar domain may operate on a different time granularity level. For example, user IP layer feedback loop 230 and user IP layer feedback loop 240 may operate on an equal time granularity level and by the finest time granularity (e.g., a sub-second or another time period) relative to the other feedback loops of the other domains. RAN layer feedback loop 232 may operate at the next finest time granularity level (e.g., about a second or another time period), followed by core layer feedback loop 238 (e.g., about a second or another time period), followed by the coarsest time granularity level (e.g., greater than a second or another time period) of transport layer feedback loop 234. According to other exemplary embodiments, the assignment of time granularities associated with the domains may be different. For example, RAN layer feedback loop 232 and core layer feedback loop 238 may operate at the same time granularity level or core layer feedback loop 238 may operate at a finer time granularity level than RAN layer feedback loop 232. Other variations may be implemented although not specifically described.

L4S end device 210 may be implemented as end device 130, as described herein. L4S RAN layer device 212 may be implemented as access device 107, as described herein. For example, L4S RAN layer device 212 may include an RU, an RU and DU, a gNB, a CU, or the like. L4S transport layer device 214 may be implemented as transport device 109, as described herein. L4S core network layer device 216 may be implemented as core device 122, as described herein. For example, L4S core network layer device 216 may be implemented as a UPF, a PGW, or another type of gateway or network device of core network 120 via which a packet flow may traverse on the user plane. L4S transport layer device 218 may be implemented as transport device 124, as described herein. L4S external network device 220 may be implemented as external device 117, as described herein. For example, L4S external network device 220 may be implemented as a network server that hosts an application service, as described herein.

As illustrated in FIG. 2, an IP packet flow 244 may be supported between L4S end device 210 and L4S external network device 220 via L4S RAN layer device 212, L4S transport layer device 214, L4S core network layer device 216, and L4S transport layer device 218. The communication between L4S interface 207 and the domain devices via user IP layer feedback loop 230, RAN layer feedback loop 232, transport layer feedback loop 234, core layer feedback loop 236, transport layer feedback loop 238, and user IP layer feedback loop 240 may support providing state information to L4S controller 125 and L4S controller 125 providing a response based on an analysis of the state information and other types of information, as described herein.

Environment 200 is exemplary and according to other embodiments, environment 200 may include additional, different, and/or fewer network devices. For example, according to other exemplary embodiments, access network 105, core network 120, and/or external network 115 may include another type of access device 107, core device 122, and/or external device 117 than those illustrated and described in relation to FIG. 2.

Figure 3:
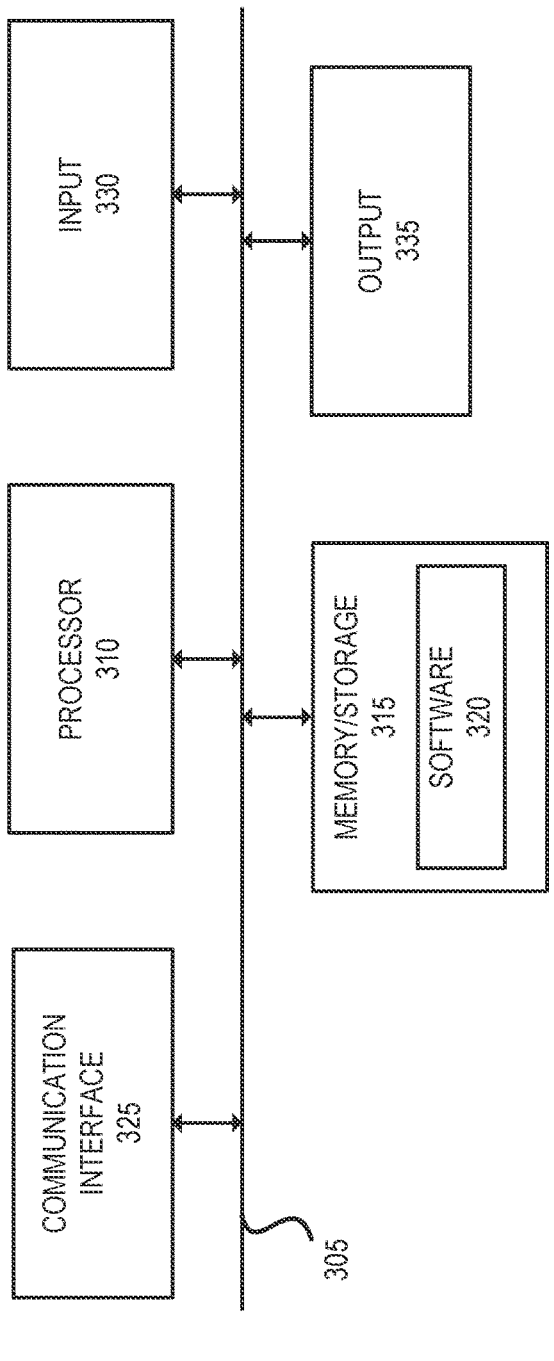
FIG. 3 is a diagram illustrating exemplary components of a device that may correspond to one or more of the devices illustrated and described herein.

FIG. 3 is a diagram illustrating exemplary components of a device 300 that may be included in one or more of the devices described herein. For example, device 300 may correspond to access device 107, external device 117, core device 122, end device 130, and/or other types of devices, as described herein. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation, or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, learning, model-based, etc.

Memory/storage 315 includes one or multiple memories and/or one or multiple other types of storage mediums. For example, memory/storage 315 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 315 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 315 may be external to and/or removable from device 300, such as, for example, a Universal Serial Bus (USB) memory stick, a dongle, a hard disk, mass storage, off-line storage, or some other type of storing medium. Memory/storage 315 may store data, software, and/or instructions related to the operation of device 300.

Software 320 includes an application or a program that provides a function and/or a process. As an example, with reference to L4S controller 125, software 320 may include an application that, when executed by processor 310, provides a function and/or a process of the coordinated domain-based L4S service, as described herein. According to another example, with reference to end device 130, access device 107, external device 117, core device 122, and transport device 109/119/124, software 320 may include an application that, when executed by processor 310, provides a function and/or a process of the coordinated domain-based L4S service, as described herein. Software 320 may also include firmware, middleware, microcode, hardware description language (HDL), and/or another form of instruction. Software 320 may also be virtualized. Software 320 may further include an operating system (OS) (e.g., Windows, Linux, Android, proprietary, etc.).

Communication interface 325 permits device 300 to communicate with other devices, networks, systems, and/or the like. Communication interface 325 includes one or multiple wireless interfaces, optical interfaces, and/or wired interfaces. For example, communication interface 325 may include one or multiple transmitters and receivers, or transceivers. Communication interface 325 may operate according to a protocol stack and a communication standard. The protocol stack may include the IP.

Input 330 permits an input into device 300. For example, input 330 may include a keyboard, a mouse, a display, a touchscreen, a touchless screen, a button, a switch, an input port, speech recognition logic, and/or some other type of visual, auditory, tactile, affective, olfactory, etc., input component. Output 335 permits an output from device 300. For example, output 335 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 300 may be implemented in the same manner. For example, device 300 may be instantiated, created, deleted, or some other operational state during its life-cycle (e.g., refreshed, paused, suspended, rebooted, or another type of state or status), using well-known virtualization technologies. For example, access device 107, core device 122, external device 117, and/or another type of network device or end device 130, as described herein, may be a virtualized device.

Device 300 may be configured to perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a function or a process described herein. Alternatively, for example, according to other implementations, device 300 may be configured to perform a function or a process described herein based on the execution of hardware (processor 310, etc.).

FIG. 4 is a flow diagram illustrating another exemplary process 400 of an exemplary embodiment of the coordinated domain-based L4S service. According to an exemplary embodiment, L4S controller 125 or a component or device of L4S controller 125, as described herein, may perform a step of process 400. According to an exemplary implementation, processor 310 executes software 320 to perform a step (in whole or in part) of process 400, as described herein. Alternatively, a step (in whole or in part) may be performed by execution of only hardware.

Referring to FIG. 4, in block 405, L4S controller 125 may receive state information, as described herein. For example, L4S controller 125 may receive state information from L4S capable devices of the domains via the domain-based feedback loops, as described herein.

In block 410, L4S controller 125 may analyze the state information, as described herein. For example, L4S controller 125 may compare values included in the state information to a policy or rule relating to the presence or absence of congestion. AI/ML device 205 may evaluate other information, as described herein.

In block 415, L4S controller 125 may determine whether there is congestion based on the analysis, as described herein. When L4S controller 125 determines that there is no congestion (block 415-NO), process 400 may proceed back to block 405. When L4S controller 125 determines that there is congestion (block 415-YES), L4S controller 125 may select a device of a domain from among the devices and domains that support the packet flow based on a predetermined order of the domains for which congestion control responses are to be provided (block 420). For example, the predetermined order of the domains may be implemented as the user IP layer domain, the RAN layer domain, the core network layer domain, and the transport network layer domain.

In block 425, L4S controller 125 may generate a congestion control response, as described herein. For example, the congestion control response may include the invocation of rate adaptation for end device 130 and/or external network device 117 (e.g., an application server) of the user IP layer domain. Additionally, or alternatively, the congestion control response may include the invocation of ECN congestion marking, for example.

In block 430, L4S controller 125 may transmit the congestion control response to the device, as described herein. Process 400 may continue to block 405.

As a part of a next iteration of process 400, if L4S controller 125 performs block 420, the device of the domain may correspond to access device 107 of the RAN layer domain. Additionally, according to another next iteration of process 400, if L4S controller 125 performs block 420, the device of the domain may correspond to core device 122 of the core network layer domain. Also, according to yet another next iteration of process 400, if L4S controller 125 performs block 420, the device of the domain may correspond to transport device 109, 119, and/or 124 of the transport layer network domain. Further, if additional iterations are performed of process 400, if L4S controller 125 performs block 420, the device of the domain may correspond to end device 130 and/or external device 117 (e.g., an application server or the like). Additionally, as described herein, for block 425, L4S controller 125 may generate the congestion control response that aligns with a congestion control and capabilities of the domain device and domain, as described herein. For example, the congestion control response for access device 107 may be different than the congestion control response for core device 122, and so forth. AI/ML device 205 may calculate the congestion control response based on the state information and/or other types of information, as described herein.

FIG. 4 illustrates an exemplary process 400 of the coordinated domain-based L4S service, however, according to other exemplary embodiments, the coordinated domain-based L4S service may perform additional operations, fewer operations, and/or different operations than those illustrated and described in relation to FIG. 4. For example, while process 400 has been described in which the predetermined order of domains may be implemented as user IP layer domain, RAN layer domain, core network layer domain, and transport network layer domain, according to other exemplary embodiments, the predetermined order of these domains may be different. Additionally, or alternatively, the order of the domains may include more than one domain subject to a congestion control response, as described herein.

For example, L4S controller 125 may generate and transmit a congestion control response to multiple L4S capable devices of two or more domains. According to still other exemplary embodiments, the coordinated domain-based L4S service may omit the predetermined order of domains aspect, as described herein.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described regarding the process illustrated in FIG. 4, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to the consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
  receiving, by one or more network devices comprising one or more processors and one or more memories, first state information from low latency, low loss, scalable throughput (L4S) capable devices associated with domains that support a packet flow end-to-end via a network;
  analyzing, by the one or more network devices, the first state information;
  determining, by the one or more network devices in response to the analyzing, congestion pertaining to the packet flow;
  selecting, by the one or more network devices, a first L4S capable device of a first domain of the L4S capable devices and the domains based on a predetermined order of the domains for which congestion control responses are to be provided, wherein the predetermined order is configured prior to receiving the first state information;
  generating, by the one or more network devices, a first congestion control response; and
  transmitting, by the one or more network devices to the first L4S capable device, the first congestion control response.

2. The method of claim 1, wherein the domains include a user domain, a radio access network domain, a core network domain, and a transport network domain.

3. The method of claim 1, wherein the first congestion control response includes a schedule for the first L4S capable device to provide a congestion control mechanism.

4. The method of claim 1, wherein the first state information is received from each of the L4S capable devices according to different timescales relating to the domains.

5. The method of claim 1, wherein the first congestion control response includes invoking rate adaptation or explicit congestion notification marking.

6. The method of claim 1, further comprising:
  receiving, by the one or more network devices after the transmitting, second state information from the L4S capable devices;
  determining, by the one or more network devices, the congestion pertaining to the packet flow;
  selecting, by the one or more network devices, a second L4S capable device of a second domain of the L4S capable devices of the domains based on the predetermined order; and
  transmitting, by the one or more network devices to the second L4S capable device, a second congestion control response.

7. The method of claim 1, wherein the analyzing further comprises:
  analyzing, by the one or more network devices, the first state information, historical state information, and historical L4S congestion control decisions and outcomes associated with an end-to-end network path of the packet flow.

8. The method of claim 1, wherein the L4S capable devices include an end device, a radio access network device, a core network device, a transport network device, and an application server device.

9. One or more network devices comprising:
  one or more processors, wherein the one or more processors are configured to:
  receive first state information from low latency, low loss, scalable throughput (L4S) capable devices associated with domains that support a packet flow end-to-end via a network;
  analyze the first state information;
  determine, in response to the analysis, congestion pertaining to the packet flow;
  select a first L4S capable device of a first domain of the L4S capable devices and the domains based on a predetermined order of the domains for which congestion control responses are to be provided, wherein the predetermined order is configured prior to receiving the first state information;
  generate a first congestion control response; and
  transmit to the first L4S capable device, the first congestion control response.

10. The one or more network devices of claim 9, wherein the domains include a user domain, a radio access network domain, a core network domain, and a transport network domain.

11. The one or more network devices of claim 9, wherein the first congestion control response includes a schedule for the first L4S capable device to provide a congestion control mechanism.

12. The one or more network devices of claim 9, wherein the first state information is received from each of the LAS capable devices according to different timescales relating to the domains.

13. The one or more network devices of claim 9, wherein the first congestion control response includes invoking rate adaptation or explicit congestion notification marking.

14. The one or more network devices of claim 9, wherein the one or more processors are further configured to:

receive, after the transmitting, second state information from the L4S capable devices;

determine, the congestion pertaining to the packet flow;

select a second L4S capable device of a second domain of the LAS capable devices of the domains based on the predetermined order; and transmit to the second L4S capable device, a second congestion control response.

15. The one or more network devices of claim 9, wherein the one or more processors are further configured to:

analyze the first state information, historical state information, and historical L4S congestion control decisions and outcomes associated with an end-to-end network path of the packet flow.

16. The one or more network devices of claim 9, wherein the L4S capable devices include an end device, a radio access network device, a core network device, a transport network device, and an application server device.

17. A non-transitory computer-readable storage medium storing instructions executable by one or more processors of one or more network devices, wherein the instructions are configured to:

receive first state information from low latency, low loss, scalable throughput (L4S) capable devices associated with domains that support a packet flow end-to-end via a network;

analyze the first state information;

determine, in response to the analysis, congestion pertaining to the packet flow;

select a first L4S capable device of a first domain of the L4S capable devices and the domains based on a predetermined order of the domains for which congestion control responses are to be provided, wherein the predetermined order is configured prior to receiving the first state information;

generate a first congestion control response; and transmit to the first L4S capable device, the first congestion control response.

18. The non-transitory computer-readable storage medium of claim 17, wherein the domains include a user domain, a radio access network domain, a core network domain, and a transport network domain.

19. The non-transitory computer-readable storage medium of claim 17, wherein the first state information is received from each of the L4S capable devices according to different timescales relating to the domains.

20. The non-transitory computer-readable storage medium of claim 17, wherein the instructions are further configured to:

analyze the first state information, historical state information, and historical L4S congestion control decisions and outcomes associated with an end-to-end network path of the packet flow.

* * * * *